United States Patent [19]

Frisbee, Jr. et al.

[11] Patent Number: 4,477,812

[45] Date of Patent: Oct. 16, 1984

[54] SIGNAL ACQUISITION AND TRACKING SYSTEM

[75] Inventors: Belmont Frisbee, Jr.; Charles E. Swedblom, both of Ridgecrest, Calif.

[73] Assignee: The United States of America as represented by the Secretary of the Navy, Washington, D.C.

[21] Appl. No.: 268,303

[22] Filed: May 29, 1981

[51] Int. Cl.[3] .................................................. G01S 5/02

[52] U.S. Cl. .................................... 343/417; 343/377; 343/774

[58] Field of Search ............... 343/774, 754, 777, 778, 343/729, 730, 725, 372, 377, 417, 374

[56] References Cited

U.S. PATENT DOCUMENTS

| | | | |
|---|---|---|---|
| 2,471,021 | 5/1949 | Bradley | 178/44 |
| 2,726,388 | 12/1955 | Kandoian et al. | 343/774 |
| 2,762,045 | 9/1956 | Stavis et al. | 343/790 |
| 2,907,032 | 9/1959 | Wheeler | 343/774 |
| 3,159,838 | 12/1964 | Facchine | 343/774 |
| 3,246,332 | 4/1966 | Waldman et al. | 343/754 |
| 3,638,224 | 1/1972 | Bailey et al. | 343/771 |
| 3,829,863 | 8/1974 | Lipsky | 343/773 |

*Primary Examiner*—Theodore M. Blum
*Attorney, Agent, or Firm*—Robert F. Beers; W. Thom Skeer

[57] ABSTRACT

Microprocessor controlled electronically scanned colinear array receiver system includes a dipole antenna mounted atop the array to provide complete scan coverage from horizon to horizon. The microprocessor controls the scan angle and the frequency range to provide full search coverage for all scan angles in a hemisphere. Simultaneous angle tracking and frequency tracking are accomplished when the desired signal is acquired.

18 Claims, 4 Drawing Figures

SIGNAL ACQUISITION AND TRACKING SYSTEM

BACKGROUND OF THE INVENTION

1. Field of the Invention

This invention relates to the field of radiation physics. More particularly, this invention relates to signal search, acquisition, and tracking systems. Still more particularly, the invention relates to an electronically scanned array used in such a tracking system. By way of further characterization the invention will be described as it relates to an electrically scanned array whose scan is controlled by a microprocessor which also controls the receiver tuning and the simultaneous angle tracking and frequency tracking of a received signal.

2. Description of the Prior Art

Bicone antennas and their radiation pattern when stacked in a collinear array are well known as is electronic scanning of an array pattern by phase shifting. Search and tracking systems using gimbel mounted antenna systems having helical, raster, or nodding scans have been utilized in the past. In shipboard application such antennas require complex and costly inertial stabilization inputs to accurately present information on elevated targets due to pitch and roll of the ship. Further the scan period to cover an entire hemisphere is limited by physical constraints on antenna rotation, tilt, and beam width in such systems.

SUMMARY OF THE INVENTION

The present invention has no moving parts and can electronically scan the entire hemisphere very rapidly to detect the desired signal. Some knowledge of the signal frequency of operation and its modulation format are necessary in order to prepare the microprocessor to control the antenna and receiver to track the signal.

The invention consists of an antenna, a microprocessor and a receiver operably connected to scan the hemisphere for a desired frequency. The antenna system is a vertically oriented collinear array of circumferential slot radiators excited from miniature coaxial feed lines and electronically scanned with 3 bit PIN diode phase shifters. The feed lines are routed through the center of the radiators down the axis of the array to a corporate feed structure in the base of the antenna system. The array generates a vertically polarized wave but a polarizer in the form of a cylindrical sleeve that fits over said array converts the systems output to a right-hand circularly polarized wave. Above +60° vertical angle the scan is switched to a crossed dipole antenna mounted atop the array to provide overhead coverage.

The microprocessor controls the frequency sweep of the receiver and the scan angle of the antenna system. When a desired signal is acquired the microprocessor controls the simultaneous angle tracking and frequency tracking of the signal.

An object of the invention is to provide a capability of rapidly searching an overhead hemisphere for a signal and tracking the signal while maintaining a reasonably high gain.

Another object of the invention is to provide for simultaneous angle tracking and frequency tracking of a signal.

Yet another object of the invention is to minimize interference with the desired signal, from reflected signals during the search and tracking of the signal, by utilizing a directive antenna.

These and other objects of the invention will become apparent from the description and figures, wherein.

DESCRIPTION OF THE PREFERRED EMBODIMENT

Figure 1:
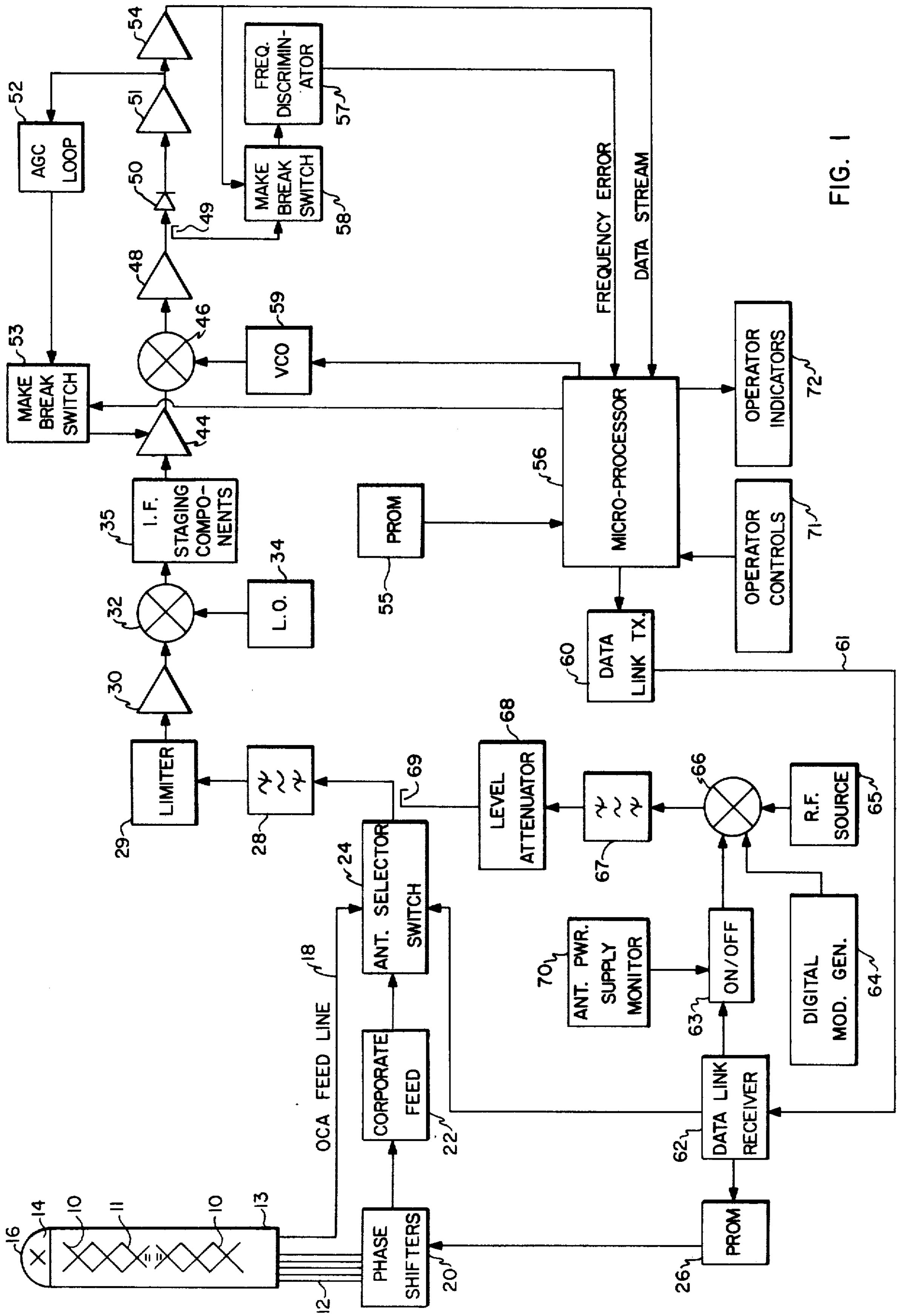
FIG. 1 is a block diagram of the invention.
Figure 2:
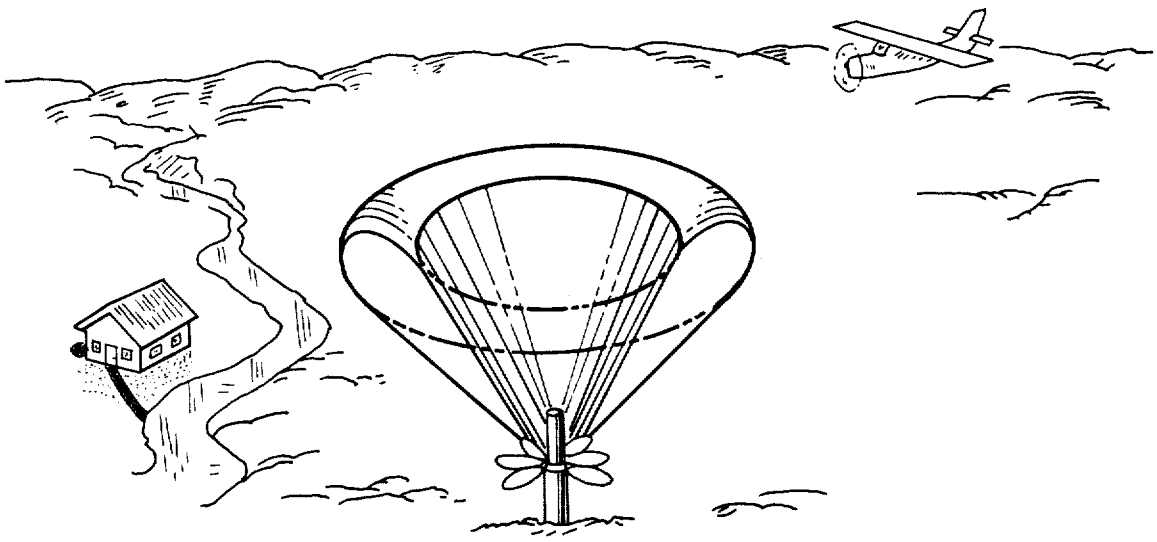
FIG. 2 illustrates the scan patterns of the bicone array.
Figure 3:
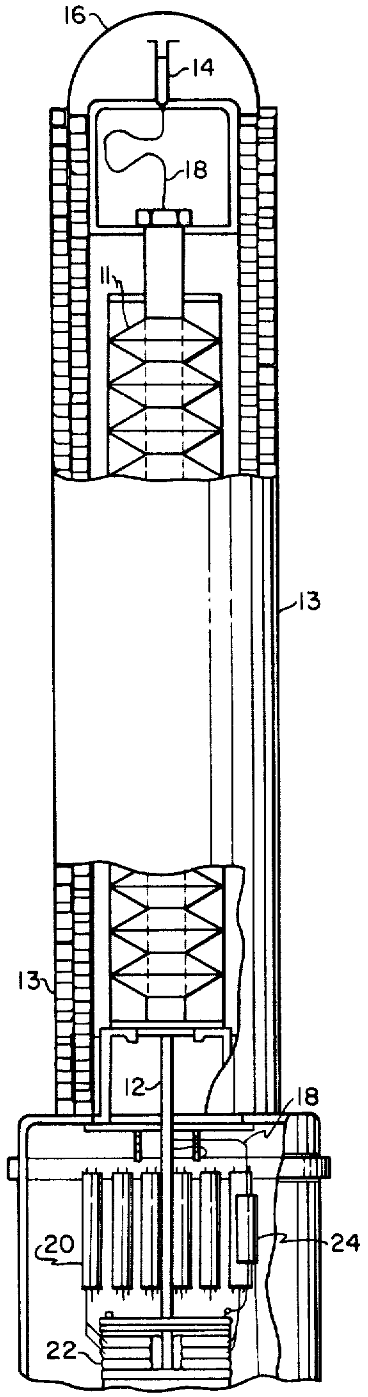
FIG. 3 is a cross section view of the vertical scanning antenna.

Referring to FIG. 1 and FIG. 3, an antenna array 10, as illustrated, is made of a plurality of bicone elements 11, stacked in a vertical alignment. In the developmental embodiment twenty-four elements were employed. The characteristic antenna pattern of array 10 in the vertical configuration with an equal phase relationship between all elements 11 is a doughnut-like pattern, omnidirectional in azimuth and having a narrow beam width in elevation. Varying the phase relationship between bicone elements 11 causes the antenna pattern to assume a conical configuration as illustrated in FIG. 2.

Figure 4:
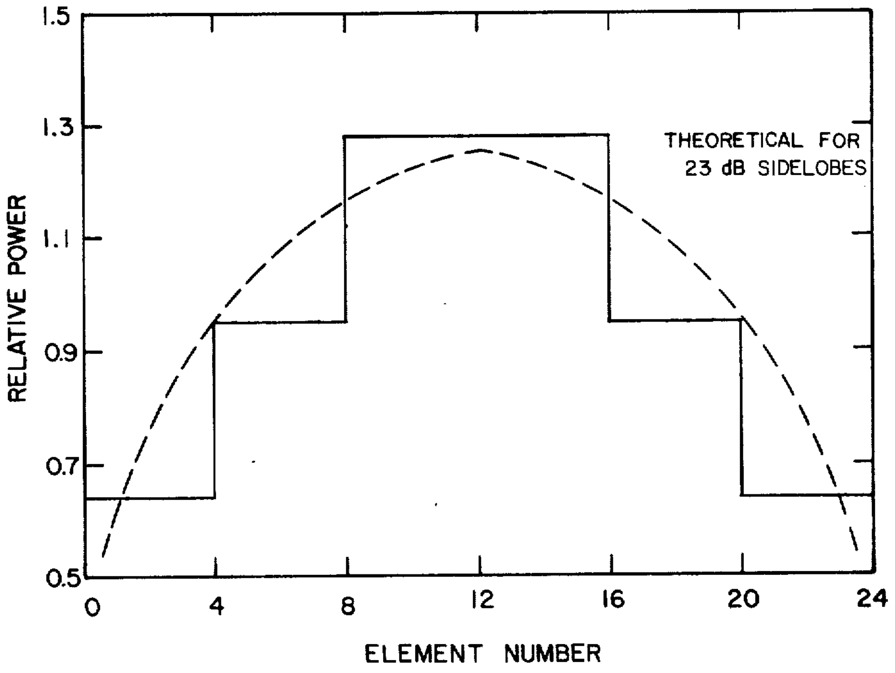
FIG. 4 illustrates the feed amplitude distribution.

Referring again to FIG. 1 or FIG. 3, bicone elements 11 are individually connected to one of a plurality of PIN phase shifters 20 by one of a plurality of coaxial cables 12 which are routed down the center of array 10 so as to avoid complicating the antenna patterns. Each phase shifter 20 is connected to a corporate feed network which provides a feed amplitude distribution shown in FIG. 4, having the appearance of a Taylor distribution across the array 10. This distribution is intended to suppress side lobes in the antenna pattern.

Each three bit phase shifter 20 is capable of being adjusted to within 45° of the desired phase relationship from 0° to 360°; therefore, in the developmental embodiment with 24 phase shifters there are seventy-two bits of information which must be fed to array 10 for each variation in the elevation angle of the antenna pattern which is accomplished by varying the phase relationship between bicone elements 11. Each of bicone elements 11 as shown in FIG. 3 consists of two conical conductors having a common axis and vertex at which it is excited. The phase relationship information is correlated in a look-up table which is stored on a programmable read only memory 26 from which the information can be extracted to adjust the antenna pattern elevation, hereafter referred to as the scan angle.

The information stored in PROM 26 is capable of shifting the scan angle in increments from sub-horizon to about +60° of elevation. Above 60° an overhead coverage antenna (OCA) 14 consisting, in the illustrated arrangement, of a simple crossed dipole antenna provides angle tracking and signal search capabilities. OCA 14 is fed by a single coaxial cable 18, called the OCA feed line. No phase shift or power division is necessary for this line.

An antenna selector switch 24, actuated by a microprocessor 56 determines whether the signal is received via array 10 or OCA 14. OCA 14 is mounted atop a cylindrical radome 13 which surrounds array 10. A hemispherical radome 16 is mounted atop cylindrical radome 13 to enclose OCA 14. Cylindrical radome 13 provides physical structural support to array 10 and is made of polarizing material so that it is in fact a Lerner grid polarizer.

Array 10, thus configured, has an antenna pattern which is a vertically polarized wave. This pattern is converted to a right hand circular wave by the polarizing action of cylindrical radome 13.

Microprocessor 56 is the main control element of the system. In the developmental model a 6800 series microprocessor was used due to its good input and output components, its simplicity to configure, and its expandable capabilities. In practical applications of the system other particular microprocessors may have characteristics which are more compatible with the particular application of the system.

A bandpass filter 28 is connected to and receives the signal output through antenna selector switch 24. Bandpass filter 28 and a limiter 29 connected thereto are designed to protect the receiver from high powered signals such as might be generated by nearby radar installations.

A low noise amplifier 30 receives the output of limiter 29 and inputs to first mixer 32 where the signal is hetrodyned with an input from a first local oscillator 34. The resultant intermediate frequency signal is amplified by a first IF amplifier. In the developmental model all of the above components except microprocessor 56 were located on rooftops or above decks on ships and were physically separated by a long cable run from the remaining components of the system thus the first IF amplifier and a second IF amplifier were necessary to insure adequate signal strength for the cable run.

In FIG. 1, IF staging components 35 refer to circuit elements found above and below decks including the first IF amplifier, the second IF amplifier, a second mixer which receives input from the second amplifier and a second local oscillator and outputs the resultant signal through a second bandpass filter. These elements are not individually shown in as much as they are standard elements. However, note that the system may be physically separated at this point as noted above. The output signal of IF staging 35 is input to automatic gain control amplifier 44 which outputs a signal to a third mixer 46 where the signal is hetrodyned with a signal from a voltage controlled oscillator 59 (VCO) which received its control voltage from microprocessor 56.

The resultant signal is input to an amplifier 48 which outputs the signal to a detector 50 which acts as a demodulation device. The output of detector 50 is input to amplifier 51 which outputs to threshold comparator 54 from which signals above a threshold level are output. The threshold level can be determined in a number of ways as is well known in the art.

An automatic gain control loop 52 is connected between the output of amplifier 51 and AGC amplifier 54. This circuit is placed in operation when on-off switch 53 is positioned in the "on" setting by microprocessor 56.

The output of threshold comparator 54 is input to microprocessor 56, however a part of that output is used to gate a make-break switch 58. Switch 58 is located between a frequency discriminator 57 and a coupler 49 which extracts a signal from the output of amplifier 48 before the signal is demodulated. Frequency discriminator 57 senses the difference between the center of the received frequency and the optimum receivable frequency, thereby generating a frequency error signal to microprocessor 56. This error signal is used by microprocessor 56 to output a digital tuning word to properly tune VCO 59 for optimum reception.

Microprocessor 56 is controlled by a fixed program in a programmable read only memory 55. A timer function internal to the microprocessor 56 is used to control the various time comparison functions required of the system.

From the data stream signal sent to microprocessor 56 by threshold comparator 54, microprocessor 56 determines whether to activate AGC loop 52. The data stream must also be examined to determine if its modulation format matches the format required for signal validation, and to determine which portion of the signal cycle contains the least data in order to effect angle tracking without losing data from the signal.

Microprocessor 56 outputs: a valid data stream for other uses; digital control data for antenna scanning; an on-off signal to AGC loop 52; a digital tuning word to VCO 59; and information to an operator indicator panel 72.

Microprocessor 56 receives inputs from frequency discriminator 57, in the form of a frequency error signal; threshold comparator 54 in the form of a data stream; PROM 55, in the form of programmed instruction; and an operator control 71.

Digital data is output from microprocessor 56 to a data link transmitter 60 which sends the data via a serial high speed data link 61, an RS-232 data link in the developmental model, to a data link receiver 62. Data link receiver 62 outputs part of this data to PROM 26 to instruct phase shifters 20 to induce the proper phase relationships in elements 11 to achieve the desired scan angle. Antenna selector switch 24 receives positioning instructions via data link receiver 62. Data link receiver 62 also outputs instruction to the signal simulator on-off switch 63.

Switch 63 controls signal simulator mixer 66 which hetrodynes signals from a digital modulation generator 64, which may be a square wave generator and an Rf source 65. The resultant signal is output to signal simulator bandpass filter 67 from which the signal is output to signal simulator level attenuator 68. The attenuated signal is coupled to the receiver system at the input of first bandpass filter 28 by signal simulator coupler 69.

Switch 63 also receives instruction from antenna power supply monitor 70. If the proper antenna power supply parameters are not met, monitor 70 maintains switch 63 in an "off" position, thus forcing the system test to fail.

In operation microprocessor 56 sends a digital data instruction to PROM 26 which in turn instructs phase shifter 20 to provide the phase relationship between bicone elements 11 which produces the desired scan angle. Microprocessor 56 sends digital tuning words to VCO 59 thereby scanning the search frequency range for a signal. If no signal is received, microprocessor 56, through the elements described above, causes the phase relationship between bicone elements 11 to change so that the scan angle is incrementally changed and the frequency range is again scanned. In the developmental model frequency scanning could occur incrementally from $-20°$ to $+60°$ of elevation by controlling the phase relationships between bicone elements 11. To search above $+60°$ of elevation, antenna selection switch 24 is instructed to position for reception from OCA 14.

If no signal is received then on-off switch 58 is never in the on position and frequency discriminator 57 never inputs a frequency error signal to microprocessor 56. Thus frequency tracking will occur only when a signal is actually being received by the system.

Assume for illustration purposes that a radio frequency signal that has been digitally modulated is received at a particular scan angle. Microprocessor 56 must examine the data stream output from threshold comparator 54 to determine whether the modulation format of the received signal is the same as the predetermined format. If the signal is validated as having the proper modulation format then microprocessor 56 must control the angle tracking of the signal source. In order to angle track with a single channel system yet lose as little data as possible microprocessor 56 determines the portion of the signal cycle containing the least data or the least reliable data, for example near the trailing edge of a squarewave.

This brief interval on successive cycles of signal reception is used to momentarily move the antenna beam up or down in an alternating fashion. Samples of this incoming signal power taken during these moments are then used to locate and point toward the angle of greatest received power. The antenna scan angle can thus be changed to achieve tracking at optimum signal reception by changing the scan angle as necessary in the direction of the stronger signal power.

Simultaneous frequency tracking is accomplished during the angle tracking of the signal source. Gated on-off switch 58 only allows connection between coupler 49 and frequency discriminator 57 when a signal above threshold noise level is indicated by threshold comparator 54. Thus in the digitally modulated illustration frequency tracking is accomplished only when a signal is present and the error signal supplied to microprocessor 56 is not distorted by noise input during a no signal period in the cycle.

Angle tracking at +60° elevation or higher is accomplished by comparing the signal strength received by OCA 14 versus the uppermost scan angle attainable by array 10.

To test the system, with the exception of the antenna components, microprocessor 56 initiates a digital signal to the signal simulator on-off switch 63 via serial data link 61. If all antenna power supply parameters are within tolerance, antenna power supply monitor 70 will permit switch 63 to be positioned on for signal simulation.

Mixer 66 will then modulate a signal from RF source 65 with the digital signal input from digital modulation generator 64. The resultant signal would be further shaped by bandpass filter 67 and attenuated to a meaningful test level by attenuator 68 before being coupled into the receiver system by coupler 69. Such a test would be able to verify whether the RF component chain within which the system was operable; whether the demodulation circuit worked; whether the frequency tracking and frequency scanning microprocessor could validate a modulation format; sensitivity of the receiver; and whether proper power supply parameters were being met at the antenna.

The above description and drawings are intended to be illustrative rather than limiting, since many modifications could be made without changing the invention's scope and principles which are defined in the appended claims.

We claim:

1. A circuit for use in a signal acquisition and tracking system in a known frequency range with a signal of known modulation characteristics comprising:
- means for receiving electromagnetic signals originating omnidirectionally in azimuth with respect to a predetermined location and from within a narrow beam width which is of variable elevation:
- a tuning network varying the frequency received over said frequency range operably connected to said receiving means; and
- means for controlling the variation in elevation of said receiving means sensitivity and for simultaneously and selectively controlling the frequency variation accomplished by said tuning network, operably connected to said receiving means and said tuning network.

2. A circuit according to claim one wherein said receiving means comprises:
- a vertically oriented array of bicone elements;
- a base upon which said array is mounted;
- an electronics chassis in said base;
- a corporate radio frequency feed network mounted in said chassis;
- a plurality of phase shifters operably connected to said feed network;
- coaxial cables, each connecting an individual array element and a phase shifter, said cables being routed through the center of said array;
- means for searching for overhead signals, mounted atop said array;
- a switch connected to said radio frequency feed network for selecting reception via said array or said searching means; and
- a coaxial cable, routed through the center of said array connecting said selector switch and said searching means.

3. A circuit according to claim 2 wherein said array is housed within a cylindrical radome, which serves as support and as a polarizer, and which is fastened to said base.

4. A circuit according to claim 3 wherein said searching means is enclosed by a hemispherical radome mounted atop said cylindrical radome.

5. A circuit according to claim 2 wherein said searching means is a simple crossed dipole antenna.

6. A circuit according to claim 1 wherein said controlling means comprises:
- a microprocessor, having outputs to said tuning network for controlling gain and frequency an output for validated data;
- a programmable read only memory containing information to enable said microprocessor to control the remainder of the system and operably connected for said microprocessor to read said information;
- an operator control terminal for supplying said microprocessor with instruction not contained with said PROM, and operably connected to said microprocessor;
- an operator indicator panel for manually monitoring the system operably connected to said microprocessor;
- a data link transmitter for transmitting data from said microprocessor to said receiving means to control said elevation scan, operably connected to said microprocessor;
- a serial data link connected to said data link transmitter;
- a data link receiver connected to said serial data link;
- a programmable read only memory containing phase/scan angle information connected to said data link receiver for receiving a signal therefrom; and having an output to said receiving means;

a signal simulator for testing said tuning network and said microprocessor connected to said data link receiver to receive on-off signal;

means connected to said signal simulator for coupling said signal into said tuning network;

an antenna power supply monitor connected to said signal simulator on-off input;

an antenna selector switch connected between the output of said receiving means and the input of said tuning network; and means for passing a selection signal to said selector switch from said data link receiver, connected therebetween.

7. A circuit according to claim 1 wherein said tuning network comprises:

a plurality of hetrodyning stages wherein a received radio frequency signal is beat to a lower frequency;

a demodulator for extracting data from said signal and having an extracted data stream as an output;

a frequency discriminator, receiving a signal from said hetrodyning states, having as an output to said microprocessor an error signal equivalent to the difference between the tuned frequency and the optimum tuneable frequency;

means for disconnecting said frequency discriminator when no signal is received;

an automatic gain control loop electrically connected between said demodulator and one of said hetrodyning stages, and connected to said microprocessor so as to receive an on-off signal; and a voltage controlled oscillator receiving a control voltage from said microprocessor.

8. A circuit according to claim 1 wherein said tuning network comprises:

a first bandpass filter electrically connected to the output of said receiving means; a limiter electrically connected to said bandpass filter;

a low noise amplifier electrically connected to said limiter;

a first mixer electrically connected to said low noise amp;

a first local oscillator electrically connected to said first mixer and providing input thereto;

a first IF amp electrically connected to said first mixer;

a second IF amp electrically connected to said first IF amp;

a second mixer connected to said second IF amp;

a second local oscillator electrically connected to and providing input to said second mixer;

a second bandpass filter electrically connected to said mixer;

an automatic gain control amplifier electrically connected to the output of said filter;

a third mixer electrically connected to the output of said automatic gain control amplifier;

a voltage controlled oscillator connected to and providing input to said third mixer, also connected to and receiving input from said controlling means;

a fifth amplifier electrically connected to said third mixer output;

a demodulator/automatic frequency control discriminator electrically connected to said fifth amplifier and providing a data stream and frequency error through electrical connection to said controlling means; and an automatic gain control loop electrically connected between said demodulator and said automatic gain control amplifier and receiving on-off commands through an electrical connection to said controlling means.

9. A circuit according to claim 8 wherein said demodulator and frequency discriminator comprises:

a detector for demodulation of input signals;

a post detector amplifier receiving input from said detector;

a threshold comparator for comparing said amplified detector output against a threshold voltage, having an output waveform with a low noise characteristic suitable for use as a data stream input to said microprocessor;

an intermediate frequency coupler for receiving signals at said detector input;

a gated switch, such that said switch remains open until a threshold voltage has been exceeded at said threshold comparator output;

means for connecting said switch and said comparator output; and a frequency discriminator for sensing the difference between the tuned frequency and the optimum receivable frequency and outputing an error signal accordingly, connected so as to receive input from said IF coupler via said gated switch and having an error signal output to said controlling means.

10. A method of signal acquisition and tracking utilizing a microprocessor controlled electrically scanned antenna and receiver system comprising the steps of:

searching a frequency range while varying the antenna pattern elevation in excess of 90°;

validating any signal received from said search; and tracking said validated signal.

11. A method according to claim 10 wherein said searching step comprises the steps of:

producing an antenna pattern that is omnidirectional in azimuth and directional in elevation;

varying the frequency to be received across the frequency range to be searched while holding the elevation of the antenna pattern constant;

increasing the elevation of the antenna pattern by one beam width when said frequency varying step has been completed; and repeating said frequency varying and increasing steps to search for the desired frequency from sub-horizon to zenith in predetermined increments.

12. A method according to claim 10 wherein said validating step comprises the steps of:

filtering received signals for desired characteristics;

providing said microprocessor with reference information as to the desired signal modulation format;

comparing signals received in said search step against said reference information; and rejecting signals which are not comparable to said reference information.

13. A method according to claim 10 wherein said tracking step comprises the steps of:

angle tracking by beam switching any validated signal for so long as said signal is present;

frequency tracking said validated signal concurrently with said angle tracking;

applying automatic gain control to said signal; and extracting data from said signal.

14. A method according to claim 13 wherein said angle tracking comprises the steps of:

determining in said microprocessor, the portion of a cycle of the received signal during which the data encoded thereon is least significant or reliable;

momentarily increasing the angle of elevation of the antenna pattern during said portion of one cycle of the received signal;

sampling and storing the received signal strength during said momentary increase in elevation angle;

momentarily decreasing the angle of elevation of the antenna pattern during the same portion of the next cycle of the received signal;

sampling and storing the received signal strength during said momentary decrease in elevation angle;

comparing in said microprocessor, said sampled signal strengths to each other; and adjusting the antenna elevation pattern toward the stronger signal to achieve optimum signal reception.

15. A method of signal acquisition and tracking utilizing a microprocessor controllable electrically scanned antenna/receiver unit and a signal in a known frequency range and modulation format comprising the steps of:

producing an antenna pattern that is omnidirectional in azimuth and directional in elevation;

varying the frequency received across the frequency range to be searched while holding the elevation of the antenna pattern constant;

increasing the elevation of the pattern one beam width when said varying step has been completed;

repeating said varying and increasing steps to search for the desired frequency from sub-horizon elevation to +60° of elevation in elevation increments equivalent to one band width;

producing an omnidirectional antenna pattern above +60° of elevation;

tuning said receiver across the frequency range to be searched while the antenna pattern is above +60° elevation;

providing said microprocessor with reference information as to said desired signal's modulation format;

comparing any received signal with said reference;

angle tracking any signal which by comparison matches the reference for as long as the signal is present;

frequency tracking said matched signal concurrently with said angle tracking; and extracting data from said tracked signal.

16. A method according to claim 11 wherein increasing the elevation of the antenna pattern comprises:

predetermining phase relationship across said antenna's aperture in accordance with a range of desired antenna pattern elevations;

addressing said phase relationship in a memory accessible to said microprocessor;

determining within said microprocessor, which elevation is currently desired; and instructing, via said microprocessor, said memory to output the phase relationship for a desired elevation to said antenna.

17. A method according to claim 10 wherein said antenna patterns are created by the use of a specialized antenna comprising:

a collinear array of bicone elements;

a base on which said array is mounted;

a 3 bit PIN diode phase shifter for each of said bicone elements, each phase shifter mounted in said base;

a coaxial cable connecting each element with its associated phase shifter, being mounted axially along the center of the array;

a cylindrical radome which also serves as a polarizer, mounted about said array and connected to said base;

a crossed dipole antenna mounted above said array on said cylindrical radome;

a hemispherical radome covering said dipole fastened to said cylindrical radome;

a switch for choosing between said dipole and said array as an active antenna, mounted in said base;

a coaxial cable connecting said dipole to said switch;

means for outputting received signals to said microprocessor/receiver;

means for inputting antenna scan control data from said microprocessor to said phase shifters.

18. An antenna system for use with a microprocessor as a scan controller, having a radiation pattern that is omnidirectional in azimuth and directed in elevation comprising:

a base;

an array of bicone elements vertically mounted on said base;

a plurality of coaxial cables, each connected to a bicone element and running down the central axis of said array;

a plurality of phase shifters, each connected to one of said coaxial cables, and mounted in said base;

a cylindrical radome which also serves as a polarizer mounted about said array and fastened to said base;

a crossed dipole antenna mounted above said array and fastened to the top of said cylindrical radome;

a hemispherical radome covering said dipole and fastened to said cylindrical radome;

a switch for choosing either said array or said dipole as the active antenna;

a coaxial cable connecting said switch and said dipole;

a chassis mounted within said base, an RF feed network marked as said chassis and connected to said phase shifter;

scan electronics connected to phase shifter and having an input from said microprocessor.

* * * * *